United States Patent [19]

Farwick et al.

[11] Patent Number: 5,517,930
[45] Date of Patent: May 21, 1996

[54] METHOD FOR OPERATING A COAL-FIRED POWER PLANT

[75] Inventors: Hermann Farwick, Dinslaken; Albert Riepert, Wesel, both of Germany

[73] Assignee: STEAG Aktiengesellschaft, Essen, Germany

[21] Appl. No.: 204,227

[22] PCT Filed: Aug. 19, 1992

[86] PCT No.: PCT/EP92/01885

§ 371 Date: Mar. 3, 1994

§ 102(e) Date: Mar. 3, 1994

[87] PCT Pub. No.: WO93/05128

PCT Pub. Date: Mar. 18, 1993

[30] Foreign Application Priority Data

Sep. 3, 1991 [DE] Germany .......................... 41 29 240.5

[51] Int. Cl.$^6$ ..................................................... F23J 11/00
[52] U.S. Cl. ............................................ 110/345; 110/222
[58] Field of Search ................................. 110/219, 222, 110/224, 218, 342, 343, 185, 186, 189, 234, 345, 347, 101 CC

[56] References Cited

U.S. PATENT DOCUMENTS

| | | | |
|---|---|---|---|
| 4,726,302 | 2/1988 | Hein et al. | 110/345 |
| 4,771,712 | 9/1988 | Engstrom et al. | 110/343 X |
| 4,960,057 | 10/1990 | Ohshita et al. | 110/343 |
| 5,001,994 | 3/1991 | Morimoto et al. | 110/347 X |
| 5,216,966 | 7/1993 | Martin | 110/345 X |

FOREIGN PATENT DOCUMENTS

| | | | |
|---|---|---|---|
| 0259883 | 3/1988 | European Pat. Off. | |
| 0338103 | 10/1989 | European Pat. Off. | |
| 2807076 | 7/1979 | Germany | 110/342 |
| 3326826 | 2/1985 | Germany . | |
| 3490720 | 8/1986 | Germany . | |
| 4002741 | 8/1991 | Germany . | |
| 4113793 | 11/1992 | Germany . | |
| 4273909 | 9/1992 | Japan | 110/219 |

OTHER PUBLICATIONS

Nordell; *Water Treatment for Industrial and Other Uses*; Reinhold Publishing Corp., 1961; pp. 291, 293.
Dipl.-Ing. Heinz Lehmann; Handbuch der Dampferzeluger-praxis; 1990; pp. 502–529.

*Primary Examiner*—Henry A. Bennet
*Assistant Examiner*—Susanne C. Tinker
*Attorney, Agent, or Firm*—Robert W. Becker & Associates

[57] ABSTRACT

A method for operating a coal-fired power plant with a dry-firing furnace includes the steps of supplying coal as a fuel and adding a Ca-containing substance to the coal. The amount of Ca-containing substance is adjusted such that such that after addition of a CaO contents of at least 0.3% is obtained. The coal with the added Ca-containing substance is burned in the dry-firing furnace whereby a flue gas is produced. The flue gas is guided through a $NO_x$ removal device, an air preheater, a particle separator, and a desulfurization device.

13 Claims, 1 Drawing Sheet

METHOD FOR OPERATING A COAL-FIRED POWER PLANT

BACKGROUND OF THE INVENTION

The invention relates to a method for operating a coal-fired power plant by using a dry-firing furnace, wherein the flue gas stream is guided through an $NO_x$ removal device, an air preheater, a dust separator, and a desulfurization device.

Flue gas streams of combustion devices must be scrubbed according to the requirements of environmental protection and the service life of the power plant of undesired components which are detrimental to the environment and/or the parts of the power plant guiding the flue gas stream.

Flue gas streams contain in addition to solid particles, which can be relatively easily filtered, detrimental admixed components which in gas streams of a sufficiently high temperature are gaseous. These detrimental admixed components in combustion devices which are using fossil fuels, are, for example, acid-forming gases such as $SO_2$, $NO_x$, $SO_3$, and hydrogen halides.

For the separation of individual gases from the flue gas stream a plurality of methods operating according to different physical-chemical principles at different gas temperatures is known. In general, a cooling of the flue gas stream between the furnace and the flue gas smoke stack takes place. Due to energy considerations, for example, the efficiency of the power plant, and with regard to environmental considerations, it is in general desired that the temperature of the flue gas stream at the end of the path, i.e., at the smoke stack, be low.

This leads to the fact that at some locations of the flue gas path the dew point temperature at least of some of the acid-forming gas components is reached and that condensation of acids at the inner parts of the power plant takes place. This condensation of acids in the flue gas path of power plants, especially of sulfuric acid and hydrogen halides, results in a great stress of the power plant parts. The parts must therefore be protected with high expenditures, for example, by enameling and coating.

For example, in conventional power plants the cooling of the flue gas stream below the dew point of sulfuric acid and hydrogen halide takes place within a heat exchanger that is used for preheating the combustion air guided into the furnace. In inexpensive regenerative heat exchangers the inner parts must therefore be coated with enamel, must be cleaned frequently, and exchanged often whereby in addition to the maintenance expenditures for servicing the heat exchanger further expenses are incurred due to the required downtime of the combustion device.

Applicant has described a method for removing undesired gaseous components in German Patent Application P 41 13 793.0-43 in which at one location of the flue gas path, where the flue gas has a temperature above the dew point temperature of the undesired gaseous component, alkaline earth oxides or hydroxides are introduced. The flue gas stream is then lowered to a temperature below the dew point temperature of the undesired component whereby at least one part of the undesired component in conjunction with the introduced alkaline earth oxides and/or hydroxides are transformed into a solid material.

In experiments after start-up of modern $NO_x$ removal devices in coal-fired power plants it has been found that the limited service life of the power plant parts downstream of the furnace, especially of the air preheater, the flue gas channels, the electrostatic filter, the forced draft channels, the desulfurization device, and the gas preheating device, has substantially two causes:

a) High flue gas temperatures during full load of 390° C., in conjunction with a high conversion rate of $SO_2/SO_3$ (at 390° C. approximately 3%, at 350° C. at most 1.1%).

b) The low flue gas temperature of less than 320° C. at partial load, in conjunction with an oversalting of the catalyst that is part of the $NO_x$ removal device.

To date a high conversion rate of up to 3% also resulted in an increase of the acid dew point of 90° C. to approximately 125° C. In the air preheater contamination were present that could no longer be scrubbed with the blowers. This resulted in deposits within the downstream parts of the flue gas path, for example, in the electrostatic filter, the flue gas channels, in the forced draft channels, and in the desulfurization device due to the higher dew point as well as an increased corrosion load.

It is therefore an object of the invention to improve the aforementioned method such that the service life of the power plant parts downstream of the furnace within the flue gas path can be increased without detrimental side effects and that deposits and corrosion stress can be reduced.

SUMMARY OF THE INVENTION

This object is solved according to the present invention by using as a fuel a CaO-containing coal dust and by adjusting the CaO contents of the fuel in a range of between 0.3% and a maximum amount at which the softening point of the combustion particles is considerably reduced.

The method for operating a coal-fired power plant with a dry-firing furnace according to the present invention is primarily characterized by the steps of:

supplying coal as a fuel;

adding a Ca-containing substance to the coal;

adjusting the amount of Ca-containing substance such that after addition a CaO contents of at least 0.3% is obtained;

burning the coal with the added Ca-containing substance in the dry-firing furnace whereby a flue gas is produced; and guiding the flue gas through a $NO_x$ removal device, an air preheater, a particle separator, and a desulfurization device.

The step of adding a Ca-containing substance preferably includes the step of continuously mixing CaO into the coal for adjusting the CaO contents to 0.4 to 0.6%.

The CaO contents is advantageously adjusted to greater than 0.6% and, preferably, a substance for increasing a softening point of combustion particles is added to the dry-firing furnace. The substance for increasing the softening point of the combustion particles is bauxite.

The method preferably further comprises the steps of transporting coal to a bin (bunker); during transporting performing the step of adding the Ca-containing substance to the coal; conveying the coal with the added Ca-containing substance from the bin to a grinding device; grinding the coal with the added Ca-containing substance to produce Ca-containing coal dust; and supplying the Ca-containing coal dust to the dry-firing furnace.

Advantageously, the method further comprises the step of separating suspended and dissolved compounds as a by-product from cooling water to be used for a cooling tower of the power plant and using the by-product as the Ca-containing substance.

The method further comprises the steps of sedimenting the suspended and dissolved compounds to form a sediment; thickening the sediment; and removing water from the sediment to form the by-product.

The step of transporting the coal to a bin preferably includes the step of guiding the coal over a conveyor-type scale for weighing. The step of adjusting an amount of Ca-containing substance includes the step of determining the amount of Ca-containing substance based on the weight of the coal.

Expediently, the step of adding a Ca-containing substance to the coal includes the step of feeding the Ca-containing substance into a grinding device for the coal.

The step of adding a Ca-containing substance to the coal includes the step of feeding the Ca-containing substance to the coal upstream of a grinding device for the coal.

The inventive method preferably also includes the step of binding arsenic with CaO to form calcium arsenate. It further comprises the step of reducing the conversion rate $SO_2/SO_3$ in a catalyst of the power plant.

Due to the adjustment of a high CaO, respectively, Ca contents in the fuel of the dry-firing furnace a substantial $SO_3$ reduction upstream of the air preheater is possible. This $SO_3$ reduction according to experiments performed by the applicant is based on two mechanisms:

1. Reaction of $SO_3$ and CaO to $CaSO_4$;
2. Conversion damping within the catalyst due to the increased alkalinity (increased CaO contents).

For example, it has been shown in practice that by increasing the CaO contents from 0.2% to 0.3% a lowering of the $SO_3$ contents in the flue gas upstream of the air preheater of about 60% can be reached. By correspondingly adjusting the contents of CaO in the fuel already upstream of the furnace the $SO_3$ binding is therefore controllable. Correspondingly, fluctuations of the acid dew point therefore no longer have a strong effect or have no effect on deposits and corrosion within the power plant parts downstream of the $NO_x$ removal device. Surprisingly, a further substantial disadvantage can be avoided by using coal dust with a strong CaO contents: the relatively high CaO contents binds arsenic traces (binding of arsenic with CaO to form calcium arsenate) so that the catalyst service life is prolonged.

According to a preferred embodiment of the invention it is suggested that CaO is continuously mixed into the coal dust before the coal reaches the furnace and that the CaO contents is adjusted to a range of between 0.4 to 0.6%. The adjustment of the CaO contents within this range is relatively uncritical. It is therefore possible to use coal with greatly varying CaO contents and to adjust the desired CaO contents by preferably continuously liming the fuel upstream of the furnace.

In certain cases it may be expedient to adjust the lime contents above the critical limit of 0.6%. In order to avoid falling below a predetermined softening point of the combustion particles, according to another embodiment of the invention a substance, for example bauxite ($Al_2O_3$), may be added to the dry-firing device which substance increases the softening point of the combustion particles.

For a conventional fuel loading of modern coal-fired power plants (in which the coal is transported to a bunker, conveyed from the bunker to a grinder, ground and added to the furnaces of the dry-firing device), the addition of a Ca-containing substance to the coal is preferably performed during the transport of the coal to the bunker. In a preferred embodiment of the invention it is suggested in this context that the Ca-containing substance is a by-product resulting from the water treatment device (KZA) for treating additional water for the cooling tower. This KZA by-product is sedimented, thickened, and dewatered before it is added to the fuel.

During the transport to the bunker the coal may be guided over a conveyor type scale and the value measured at the conveyer-type scale may be used as a parameter for the addition of the Ca-containing substance. The adjustment of the CaO contents in the coal dust (fuel) to between 0.4 and 0.6% furthermore makes it possible to use the air preheater as an acid trap.

Known measures for increasing the service life of the involved parts, for example, the replacement of the air preheater sheet metal by an enameled ones on the cold side, are favorably supported by the inventive method. The inventively ensured high calcium oxide contents supports the acid formation within the air preheater and its use as an acid trap. The flue dust formed is mostly alkaline. The $SO_3$ contents downstream of the desulfurization device is substantially reduced with the inventive method. This is also true for the corrosion damage within the flue gas channels leading to the smoke stack.

BRIEF DESCRIPTION OF THE DRAWING

In the following the invention will be explained in detail with an embodiment represented in the drawings. In the drawings it is shown in.

DESCRIPTION OF PREFERRED EMBODIMENTS

Figure 1:
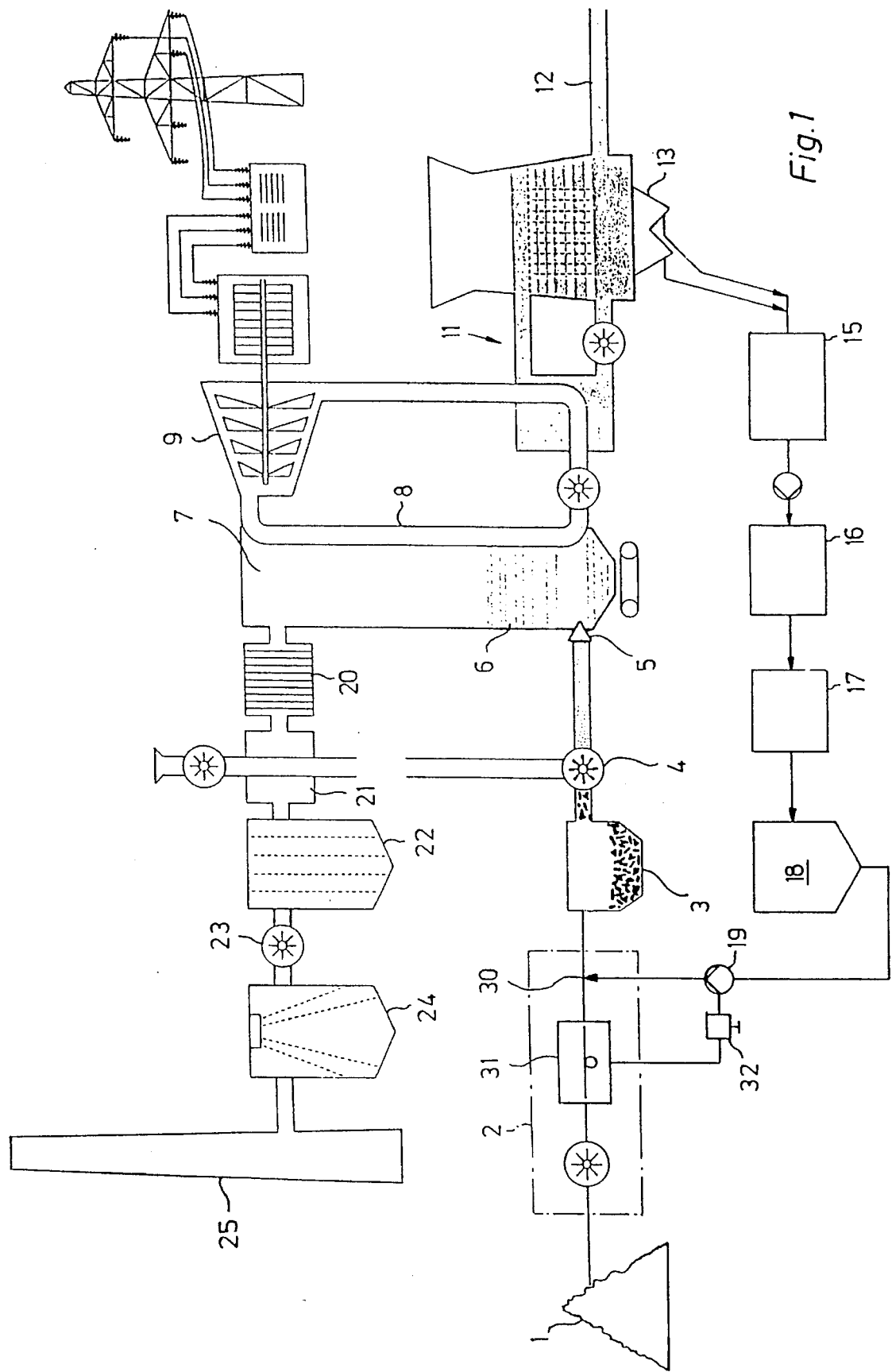
FIG. 1—the essential parts, partially as a block diagram, of a stone coal power plant in which the inventive method may be realized.

The described method is based on the following power plant processes: the coal is transported from a coal storage 1 via a conveying device 2, schematically represented as a dash-dotted block 2, to a coal bunker 3 and from there to the corresponding coal grinder 4. The coal is ground in the coal grinder 4, dried with hot air and guided as fuel to the furnace arrangement 5 of a dry-firing combustion device 6. The heat resulting from the combustion of the coal in the dry-firing combustion device is transferred via a pipe system to the steam generator 7. The water streaming through the pipes 8 is evaporated under pressure and guided subsequently in the form of heating steam to the turbine 9. The energy present at the turbine is then transformed into electric energy. At the low pressure side of the turbine a cooling system, which as a whole is indicated by reference numeral 11, performs the condensation of the steam. The condensate is returned via a boiler water feed pump into the steam generator 7.

The flue gases from the combustion process within the steam generator 7 are scrubbed of $NO_x$ in the $NO_x$ removal device 20 and are cooled in the air preheater 21 by preheating the combustion air. Subsequently, a dust separation takes place within the electrostatic filter 22 and the flue gas freed of dust is guided with a flue gas blower 23 into the desulfurization device 24. The scrubbed gas exiting from the desulfurization device 24 is then released into the atmosphere via the smoke stack 25. The cooling takes place in a closed cooling circuit 11. In the main cooling circuit water losses are unpreventable. On the one hand, a considerable evaporation takes place via the cooling tower as a function of the output of the power plant block. On the other hand, losses occur due to wash water, spray water for condensate cooling, and finally due to removal of deposits within the cooling tower bottom. These losses must be compensated for whereby high quality requirements are placed onto the water to be added to the closed cooling water circuit in order to avoid boiler scale deposits as well as a contamination within the condensator area and in the inserts of the cooling towers, respectively, to at least minimize such effects.

The raw water introduced via the line 12 is mixed in a mixing and distributing chamber with iron chloride solution in order to flocculate suspended solid particles. In a flocculating device lime suspension and contact sludge is added to the water and intensively mixed. The calcium carbonate formed from the lime suspension and hydrogen carbonate is deposited as a solid material. Together with the iron hydroxide it forms large flocculate particles that settle within the calm zone 13 of the flocculating device. The treated water then flows via a treated water chamber to the cooling tower bottom.

The by-product of interest in the inventive process, which has been flocculated and settled and consists of calcium carbonate, sediments (solid particles) of the raw water, and iron hydroxide, is conveyed with conveying scrapers into pockets and is guided via a buffer container 15 to a thickening device 16. Here a predewatering of the sludge takes place. With high pressure pumps that are not represented in the drawing the thickened sludge is then forced through chamber filter presses 17 and dewatered. The filter cake falls into a bunker 18 and is then available for further use or disposal.

Up till this point the described process for operating a power plant is conventional. As mentioned above, the conventional realization of the methods of operating power plants resulted in high conversion rates in the $NO_x$ removal device 20 in addition to an increase of the acid dew point at full load at the exit of the air preheater 21 to approximately 125°. This resulted in the fact that the uncritical air preheater could not be used to the desired extent as an acid trap for binding $SO_3$. The aggressive flue gas components, especially $SO_3$, caused in the downstream parts, i.e., electrostatic filter 22, flue gas channels and blower as well as within the desulfurization device 24 in deposits and a considerable corrosion stress.

Inventively, it is suggested to provide already during fuel preparation in the area of the coal conveying device 2 the coal with a higher Ca, respectively, CaO contents so that the aforementioned disadvantages of conventional power plant processes with dry-firing combustion devices are eliminated or at least substantially reduced. For this purpose, upstream of the coal bunker 3 the by-product of the water treatment device for additional water for the cooling towers, that is in the form of the filter cake of the filter presses 17 and is stored in the bunker 18, is added. This by-product is comprised to approximately 80 to 90% (dry) of calcium carbonate ($CaCO_3$) corresponding to a CaO contents of 45 to 55%. The addition of the KZA by-product takes place via the pump 19 in a continuous manner. The KZA by-product is added to the coal at the location 30 on the conveyor belt conveying the coal from the bunker. As a parameter for the adjustment of the CaO-containing KZA by-product the conveyor-type scale 31 is used in the described embodiment. The ratio can be adjusted via a suitable regulator 32 as a function of the CaO contents of the coal taken from the coal storage 1. The continuous liming at the location 30 upstream of the coal bunker 3 has the advantage that the CaO contents for the entire contents of the coal bunker 3 can be adjusted in a uniform manner and independent of the partial or full load operation of the power plant and the amount of coal removed from the bunker 3. A special advantage of the described inventive process lies in the fact that the Ca-containing substance is produced directly within the process of the power plant so that no additional and likely expensive materials must be used. It has been shown in experiments that for the described type of cooling and the use of coal low in Ca as a fuel substantially exactly such an amount of the KZA by-product is produced in the KZA process as is needed for increasing the amount of CaO of the fuel at the location 30 (balanced mass flow).

Of course, it is also possible to use any other suitable Ca-containing substance in connection with cooling systems or as an alternative for addition to the fuel upstream of the furnace device 5. The addition may also take place in the area of the coal grinder 4 or downstream thereof in the fuel-air mixture. For the given conditions of the described process of operating a power plant, the connection of the KZA by-product production to the coal-conveying device 2 is especially favorable.

The present invention is, of course, in no way restricted to the specific disclosure of the specification and drawings, but also encompasses any modifications within the scope of the appended claims.

What we claim is:

1. A method of operating a coal-fired power plant with a dry-firing furnace for lowering the $SO_3$ contents of the flue gas downstream of a $NO_x$ removal device, said method comprising the steps of:

supplying coal as a fuel;

burning the coal in the dry-firing furnace, whereby a flue gas is produced;

guiding sequentially the flue gas through a $NO_x$ removal device, an air preheater, a particle separator, and a desulfurization device;

reducing a conversion of $SO_2$ to $SO_3$ in the $NO_x$ removal device by adding a Ca-containing substance to the coal before burning; and adjusting an amount of Ca-containing substance such that after addition a CaO contents is between 0.3% and a maximum amount at which the softening point of the combustion particles is considerably reduced.

2. A method according to claim 1, wherein said step of adding a Ca-containing substance includes the step of continuously mixing CaO into the coal for adjusting the CaO contents to 0.4 to 0.6%.

3. A method according to claim 1, wherein the CaO contents is adjusted to greater than 0.6%, further comprising the step of introducing into the dry-firing furnace a substance for increasing a softening point of combustion particles.

4. A method according to claim 3, wherein said substance for increasing a softening point of combustion particles is bauxite.

5. A method according to claim 1, further comprising the steps of:

transporting coal to a bin;

during said step of transporting performing said step of adding a Ca-containing substance to the coal;

conveying the coal with the added Ca-containing substance from the bin to a grinding device;

grinding the coal with the added Ca-containing substance to produce Ca-containing coal dust; and supplying the Ca-containing coal dust to the dry-firing furnace.

6. A method according to claim 5, further comprising the step of separating suspended and dissolved compounds as a by-product from cooling water to be used for a cooling tower of a power plant and using the by-product as the Ca-containing substance.

7. A method according to claim 6, further comprising the steps of:

sedimenting the suspended and dissolved compounds to form a sediment;

thickening the sediment; and removing water from the sediment to form the by-product.

8. A method according to claim 5, wherein said step of transporting the coal to a bin includes the step of guiding the coal over a conveyor-type scale for weighing and wherein said step of adjusting an amount of Ca-containing substance includes the step of determining the amount of Ca-containing substance based on the weight of the coal.

9. A method according to claim 1, wherein said step of adding a Ca-containing substance to the coal includes the step of feeding the Ca-containing substance into a grinding device for the coal.

10. A method according to claim 1, wherein said step of adding a Ca-containing substance to the coal includes the step of feeding the Ca-containing substance to the coal upstream of a grinding device for the coal.

11. A method according to claim 1, further comprising the step of binding arsenic with CaO to form calcium arsenate.

12. A method according to claim 1, further comprising the step of reducing a conversion rate $SO_2/SO_3$ in a catalyst of the power plant.

13. A method according to claim 1, further including the step of reacting $SO_3$ and CaO to form $CaSO_4$ for lowering the $SO_3$ contents.

* * * * *